United States Patent [19]

Watabe et al.

[11] Patent Number: 5,793,186
[45] Date of Patent: Aug. 11, 1998

[54] CHARGING TERMINAL SHORTCIRCUIT PREVENTING CIRCUIT FOR BATTERY PACK

[75] Inventors: Hisashi Watabe; Yoshitaka Tokuyama, both of Tokyo, Japan

[73] Assignee: Kyocera Corporation, Kyoto, Japan

[21] Appl. No.: 832,160

[22] Filed: Apr. 2, 1997

Related U.S. Application Data

[63] Continuation of Ser. No. 600,865, Feb. 13, 1996, abandoned.

[30] Foreign Application Priority Data

Feb. 28, 1995 [JP] Japan ............... 7-067012

[51] Int. Cl.$^6$ ............... H02J 7/00; H02J 7/06
[52] U.S. Cl. ............... 320/112; 320/163
[58] Field of Search ............... 320/162, 163, 320/164, 112; 429/92

[56] References Cited

U.S. PATENT DOCUMENTS

| | | | |
|---|---|---|---|
| 3,735,233 | 5/1973 | Ringle | 320/39 X |
| 4,709,201 | 11/1987 | Schaefer et al. | 320/112 |
| 4,920,307 | 4/1990 | Iketani | 320/28 |
| 5,177,426 | 1/1993 | Nakanishi et al. | 320/13 |
| 5,200,690 | 4/1993 | Uchida | 320/27 X |
| 5,465,039 | 11/1995 | Narita et al. | 320/28 X |
| 5,477,130 | 12/1995 | Hashimoto et al. | 320/49 |
| 5,493,197 | 2/1996 | Eguchi et al. | 320/29 X |

FOREIGN PATENT DOCUMENTS 696758  4/1994  Japan.

*Primary Examiner*—Peter S. Wong
*Assistant Examiner*—K. Shin
*Attorney, Agent, or Firm*—Loeb & Loeb LLP

[57] ABSTRACT

A charging terminal shortcircuit preventing circuit for a battery pack, capable of firmly preventing a shortcircuit and with employing a simple structure. In a battery pack so constructed that a charge current is supplied from a charger via a charging terminal to a battery, and a current is supplied from the battery via an output terminal to a portable appliance, and further the current from the charger via a through-input terminal and a through-output terminal to the portable appliance, there are provided a switch 22 for turning ON/OFF the charge current between the battery 21 and the charge terminal $T_4$, and switch operating means for detecting an application of a voltage to the through-input terminal $T_6$ to thereby turn ON the switch 22. Also, in a battery pack 2, a resistor having a large resistance value is connected parallel to the switch 22, and a battery pack mount detecting means of the charger 3 detects a voltage at the charging terminal $T_4$ of the battery pack in order to detect mounting of the battery pack 2.

6 Claims, 3 Drawing Sheets

CHARGING TERMINAL SHORTCIRCUIT PREVENTING CIRCUIT FOR BATTERY PACK

This is a continuation of application Ser. No. 08/600,865 filed on Feb. 13, 1996, now abandoned.

BACKGROUND OF THE INVENTION

The present invention relates to a charging terminal shortcircuit preventing circuit for a battery pack used in a portable appliance such as a portable telephone.

Conventionally, this sort of technique has been disclosed in Unexamined Japanese Paten Publication (Kokai) 6-96758 (1994). FIG. 3 illustrates an example of the conventional shortcircuit preventing circuit for the power supply terminals of the battery pack. A battery pack 104 is utilized as a power supply of a portable appliance. As shown in the drawing, the conventional battery pack 104 is equipped with a switch 141, a terminal 142, a terminal 143, and a battery 144. This battery pack 104 is mounted in such a manner that if the terminal 142 and the terminal 143 are made in contact with terminals of an appliance under user (not shown) when this battery pack 104 is mounted on the appliance under use, then the switch 141 is mechanically depressed to operate this battery pack 104. When the battery pack 104 is mounted on the portable appliance, the terminals 142 and 143 are used as the power supply terminals, whereas when the battery pack 104 is mounted on the charger, the terminals 142 and 143 are used as the charging terminals. During the charging operation, for instance, when the battery pack is mounted on the charger, the switch 141 is operated, and the charge current is supplied from the terminals 142 and 143 to the battery 144 in order to charge this battery 144.

When the battery pack 104 is not used, since the switch 141 is under open state, even if a conductor is contacted between the terminal 142 and the terminal 143, the battery 144 is not shortcircuited, but is protected.

As other shortcircuit preventing measures for the battery, a reed relay magnetically operable is used instead of the switch 141, and a magneto is mounted on an appliance under use, and then this reed relay is actuated when a battery pack is mounted. There is another method by utilizing a PTC switch (Positive Temperature Coefficient thermistor) instead of the switch 141 so as to limit a shortcircuit current. The PTC switch owns a resistance value rapidly increased in response to a temperature rise, and such a phenomenon is utilized that the temperature is increased due to heat dissipation by the shortcircuit current during the occurrence of shortcircuit. There is a further method that insulating members are employed to bridge terminals 142 and 143 when the battery pack is not used, so that a conductor is not directly contacted between these terminals.

However, the above-explained method for mounting the mechanically operable switch 141 owns such a problem, that the mechanism must be adjusted and when this switch is repeatedly operated, reliability thereof would be lowered. Then, the method for using the magnetically operable reed switch has such a problem that this reed relay would be erroneously operated when a magnetic product such as a magnetic necklace approaches, or is in contact with this reed relay. Also, another method for using the PTC switch owns such a problem that it is difficult to prevent the imperfect shortcircuit condition. Further, the method for covering the terminals by the insulating members under non-use condition so as to prevent the conductor from being directly contacted between the terminals has such a problem that it is mechanically difficult to automatically operate this means.

SUMMARY OF THE INVENTION

The present invention has been made to solve the above-described problems, and therefore, has an object to provide a charging terminal shortcircuit preventing circuit for a battery pack, capable of firmly preventing a shortcircuit with a simple circuit arrangement.

To solve the above-explained problems, the present invention is characterized by that in a battery pack including a battery, a charging terminal, an output terminal, a through-input terminal, and a through-output terminal, for supplying a charge current from a charger via the charging terminal to the battery, for supplying a current from the battery via the output terminal to a portable appliance, and further for supplying the current from the charger via the through-input terminal and the through-output terminal to the portable appliance, a charging terminal shortcircuit preventing circuit for a battery pack is comprised of a switch for turning ON/OFF the charge current between the battery and the charge terminal; and switch operating means for detecting an application of a voltage to the through-input terminal to thereby turn ON the switch.

Also, the present invention is characterized by that the charger includes battery pack mount detecting means for detecting that the battery pack is mounted, and is constructed by that when the battery pack mount detecting means detects that the battery pack is mounted, the charge current is supplied to the battery pack; a resistor having a large resistance value is connected parallel to the switch in the battery pack; and the battery pack mount detecting means of the charger detects a voltage at the charging terminal of the battery pack in order to detect mounting of the battery pack.

The present invention is characterized by that when the portable appliance is not equipped with a structure for accepting a supply of power via the through-input terminal and the through-output terminal, the through-output terminal is eliminated and the through-input terminal is used as a terminal for exclusively detecting the voltage.

The above-described charging terminal, charging terminal and through-input terminal are so arranged that when the battery pack is mounted to the charger, these terminals are made in contact with the terminals provided at the charger sides. As previously explained, according to the present invention, since the voltage at the through-input terminal is detected and the switch is operated by the switch operating means, the switch is operated only when the battery pack is mounted to the charger and then the charging circuit is formed. As a consequence, since the switch is under open state when no charging operation is performed during portable condition of the electronic appliance, even if the conductor is contacted between the charging terminal and the charging terminal, the battery is not brought into the shortcircuit condition, but may be protected from the shortcircuit.

Furthermore, since the resistor having the large resistance value is connected parallel to the switch, the charger can electrically detect the voltage at the output terminal during the charging operation, by which the battery pack is mounted. Therefore, there is no mechanical limitation to detect mounting of the battery pack, and the reliability thereof is improved and the cost is reduced. Moreover, since the switch is under open state when the no charging operation is performed while the electronic appliance is transported, even when the conductor is contacted between the charging terminal and the charging terminal, the battery is discharged via the high resistance resistor. Thus, only the minimum discharge current may flow from the battery so that the battery can be protected from the shortcircuit.

DETAILED DESCRIPTION OF PREFERRED EMBODIMENTS

Figure 1:
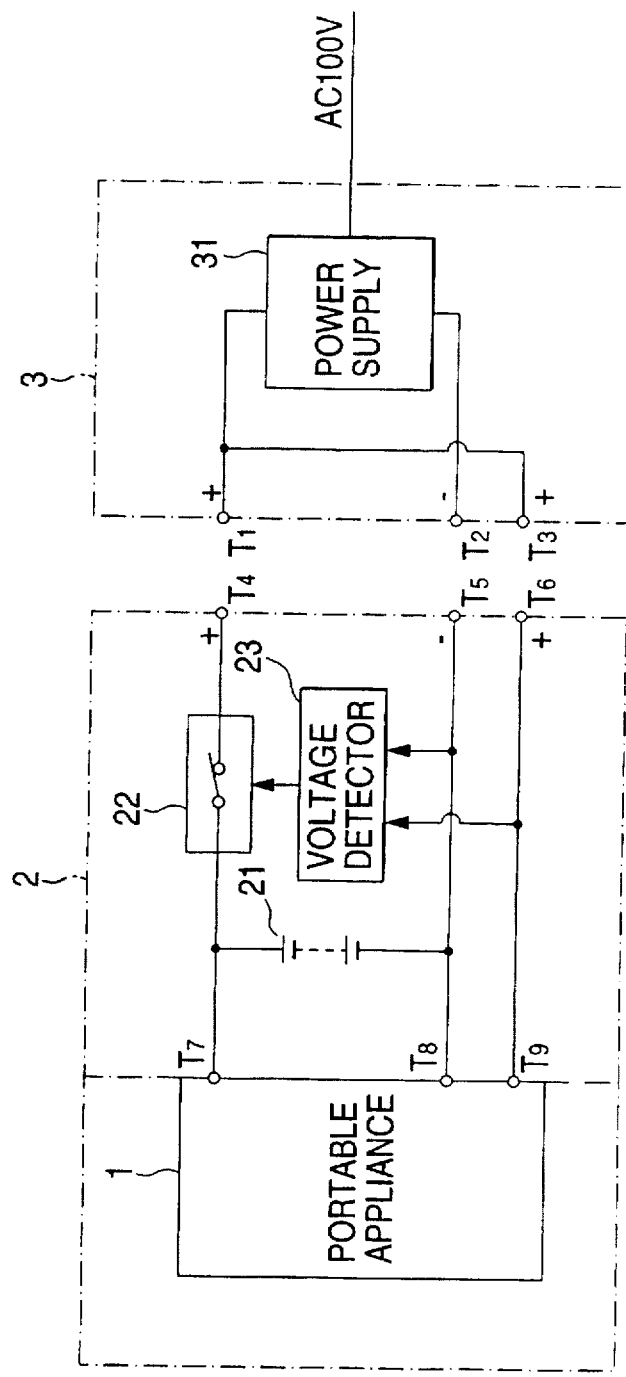
FIG. 1 is a diagram for showing a charging terminal shortcircuit preventing circuit for a battery pack according to the first embodiment of the present invention.

An embodiment of the present invention will now be described in detail with reference to drawings. FIG. 1 is a diagram for showing a charging terminal shortcircuit preventing circuit for a battery pack, according to the first embodiment of the present invention. As shown in this drawing, a battery pack 2 according to the present invention is arranged by a rechargeable battery 21, a switch 22 for ON/OFF-controlling a charge current, a voltage detector 23 for detecting a voltage at a through-input terminal $T_6$, a charging terminal $T_4$ and a charging terminal $T_5$ for receiving a supply of the charge current from the charger 3, an output terminal $T_7$ and an output terminal $T_8$ for supplying power to a portable appliance 1, and also the through-input terminal $T_6$ and a through-output terminal $T_9$ for supplying the power from the charger 3 therethrough to the portable appliance 1.

The charging terminal $T_4$ of the battery pack 2 is connected via the switch 22 to the positive polarity side of the battery 21 and the output terminal $T_7$, the charging terminal $T_5$ (negative polarity side) is connected to the negative polarity side of the battery 21 and the output terminal $T_8$, and the through-input terminal $T_6$ is connected to the through-output terminal $T_9$ on the output side. The voltage detector 23 is connected in such a manner that this voltage detector 23 detects the voltage between the through-input terminal $T_6$ and the charging terminal $T_5$ (negative polarity side) to operate the switch 22.

The charger 3 is constructed of a power supply circuit 31 for converting an AC 100V into a proper DC charging voltage, an output terminal $T_1$ (positive polarity side) and an output terminal $T_2$ (negative polarity side) for supplying the charging current, and a through-terminal $T_3$. Normally, to the portable appliance 1, the battery pack 2 is mounted, and the power is supplied from the battery 21 via the output terminals $T_7$ and $T_8$. During the charging operation, the battery pack 2 is mounted on the charger 3 under present state, and the output terminal $T_1$, the output terminal $T_2$, and the through terminal $T_3$ are made in contact with the charging terminal $T_4$, the charging terminal $T_5$ and the through terminal $T_6$ of the battery pack 2, respectively.

The voltage detector 23 detects the voltage between the through-input terminal $T_6$ and the charging terminal $T_5$ (negative polarity side) to operate the switch 22. The charge current is supplied from the charging terminal $T_4$ via the switch 22 to the battery 21. The through-input terminal $T_6$ and the through-output terminal $T_9$ are employed so as to supply the power from the charger 3 to the portable appliance 1 when the battery 21 is not used or the battery 21 is under charging operation. It should be noted that although being omitted in the above-described embodiment, the charger 3 is so constructed that mounting of the battery pack 2 is sensed by the mechanical manner, and after mounting of the battery pack 2 is detected, the charge current is supplied to the battery pack 2.

As previously explained, in accordance with the battery pack 2 of the present invention, only when the battery pack 2 is mounted on the charger 3, the switch 22 is operated to form the charging circuit. As a result, when no charging operation is carried out while the electronic appliance is transported, since the switch 22 is under open state, even when the conductor is contacted between the charging terminal $T_4$ and the charging terminal $T_5$, the battery 21 is not shortcircuited, but can be protected from the shortcircuit.

Figure 2:
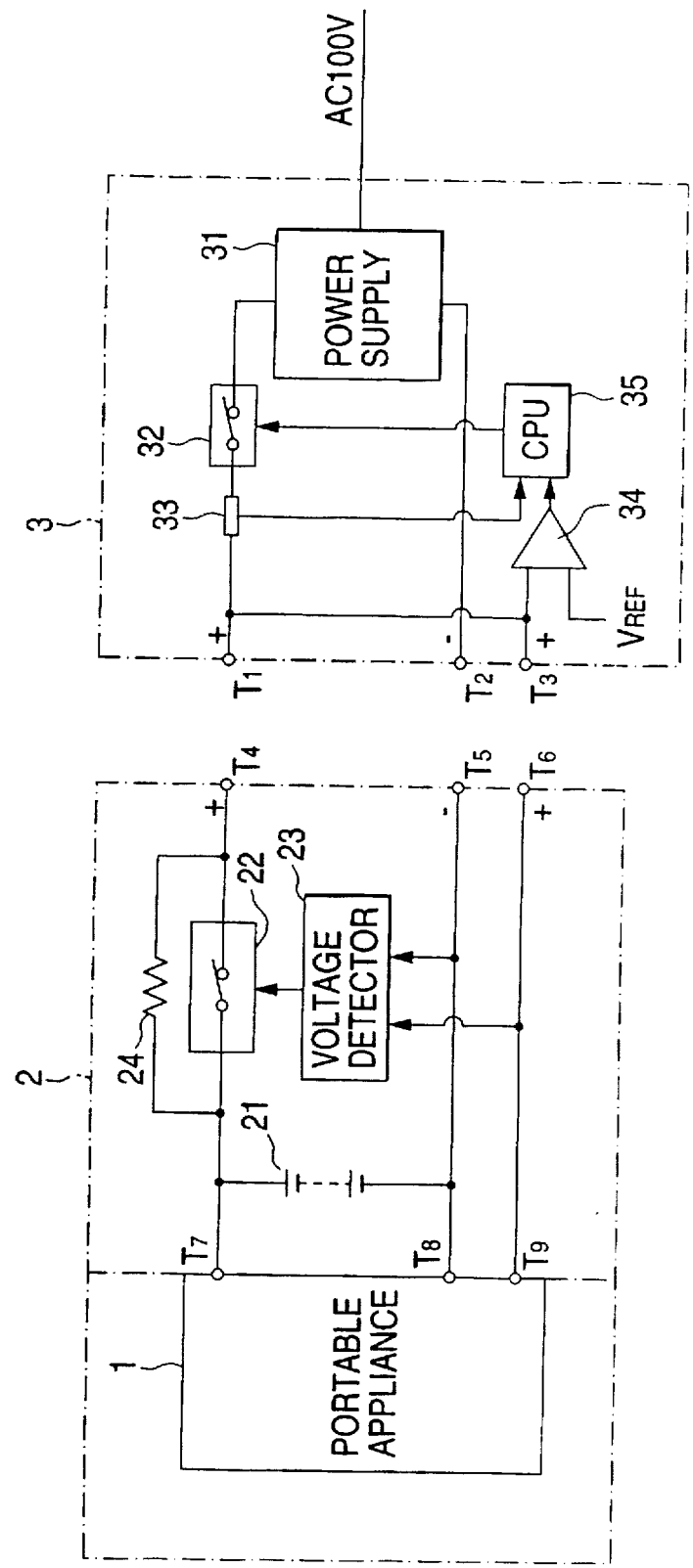
FIG. 2 is a diagram for showing a charging terminal shortcircuit preventing circuit for a battery pack according to the second embodiment of the present invention.
Figure 3:
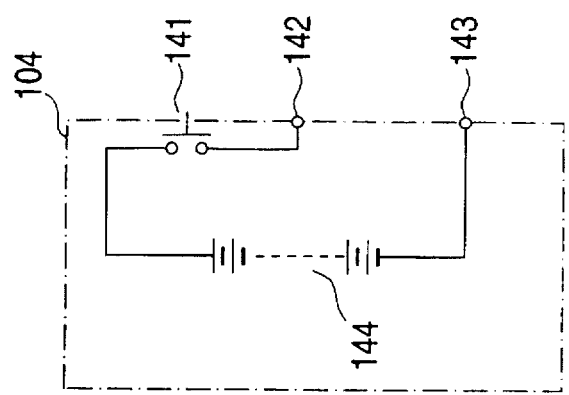
FIG. 3 is a diagram for showing the conventional charging terminal shortcircuit preventing circuit for the battery pack.

FIG. 2 is a diagram of a charging terminal shortcircuit preventing circuit for a battery pack according to the second embodiment of the present invention. The shortcircuit preventing circuit of the second embodiment is such a circuit constructed by adding a function to electrically detect that the battery pack 2 is mounted on the charger 3 to the above-described shortcircuit preventing circuit of the first embodiment. The same reference numerals shown in FIG. 1 are employed as these for denoting the components having the same operational functions, and explanations thereof are omitted.

As indicated in FIG. 2, in the battery pack 2, a resistor 24 having a large resistance value is connected parallel to a switch 22, and a voltage of the battery 21 is outputted via the resistor 24 to the charging terminal $T_4$ during no charging operation.

In the charger 3, there are provided a comparator 34 for detecting a voltage at the output terminal $T_1$, a shunt 33 for detecting a current, an output switch 32, and a CPU 35 for controlling an output switch 32 with using a charge voltage and a charge current as an input signal.

Normally, several tens percents of an entire voltage of a lithium battery remains even under discharge end condition (namely, under condition that lithium battery is required to be charged), and the voltage of the battery 21 is outputted via the resistor 24 having the large resistance value to the charging terminal $T_4$. When the battery pack 2 is mounted on the charger 3, the comparator 34 of the charger 3 detects the voltage of the battery 21 at the output terminal $T_1$ and outputs the detection of this voltage to the CPU 35, so that the CPU 35 judges that the battery pack 2 is mounted, and closes the output switch 32 to commence the charging operation. The shunt 33 detects the charging current and outputs the detection of this charging current to the CPU 35, so that the CPU 35 judges the completion of the charging operation based upon the charge current value and opens the output switch 32.

As previously described, in the circuit of the second embodiment shown in FIG. 2, since the resistor 24 having the large resistance value is connected parallel to the switch 22, the charger 3 can electrically detect that the battery pack 2 is mounted based on the voltage at the output terminal $T_1$. Thus, there is no mechanical limitation to detect mounting of the battery pack and the reliability thereof could be improved. Moreover, in the case that the battery 21 is not charged when the electronic appliance is transported, since the switch 22 is under open state, even when the conductor is contacted to the charging terminals $T_4$ and $T_5$, the battery 21 is discharged via the high resistance resistor. Therefore, only such a minimum discharge current may flow from the battery 21 and this battery 21 can be protected from the shortcircuit.

Although the CPU 35 has been used in the above-described embodiment as the controller of the charger 3, a control circuit using an analog element and the like may be employed.

It should be understood that in the charging terminal shortcircuit preventing circuits for the battery packs shown in FIG. 1 and FIG. 2, the portable appliance 1 is comprised of the connecting structure with the through-output terminal $T_9$. In the case that this connecting structure is not employed, namely no through-output terminal $T_9$ is required, this through-output terminal $T_9$ may be provided as a terminal for exclusively detecting a voltage (elimination of through-output terminal $T_9$).

As previously explained in detail, according to the present invention, the below-mentioned improved effects may be expected.

In accordance with the battery pack of the invention, only when the battery pack is mounted to the charger, the switch is operated and the charging circuit is formed. As a consequence, when the charging operation is not performed in such a case that the electronic appliance is transported, since the switch is under open state, even if the conductor is contacted to the charging terminal, the battery is not short-circuited.

Furthermore, in accordance with the invention, the resistor having the large resistance value is connected parallel to the switch, the charger can electrically detect that the battery pack is mounted based on the voltage at the output terminal. Thus, there is no mechanical limitation to detect mounting of the battery pack and the reliability thereof could be improved. Moreover, in the case that battery is not charged when the electronic appliance is transported, since the switch is under open state, even when the conductor is contacted to the charging terminals, the battery is discharged via the high resistance resistor. Therefore, only such a minimum discharge current may flow from the battery and this battery can be protected from the shortcircuit.

What is claimed is:

1. A charging terminal short-circuit prevention circuit for use in a battery pack, the battery pack including a rechargeable battery, at least first and second charging terminals for supplying a charge current from a charger to the battery, and at least first and second output terminals for supplying a current from the battery to a portable appliance, the charging terminals being spaced from the output terminals, the short-circuit prevention circuit comprising:

a voltage detecting terminal for detecting an output voltage of the charger, the voltage detecting terminal being spaced from the charging terminals and the output terminals, a switch for turning on and off a charge current between the battery and at least one of the charging terminals, and switch operating means for turning on the switch when application of a voltage to the voltage detecting terminal is detected.

2. The circuit of claim 1, comprising a resistor having a large resistance value connected to the switch, wherein the charge current is supplied to the battery pack when a mounting of the battery pack on the charger is detected based on a voltage at at least one of the charging terminals of the battery pack.

3. The circuit of claim 1, comprising a through-output terminal spaced from the charging terminals, the output terminals and the voltage detecting terminal, for directly supplying current input from the voltage detecting terminal to the portable appliance when the battery is not used or when the battery is being charged.

4. A battery pack with a charging terminal short-circuit prevention circuit comprising:

a rechargeable battery, at least first and second charging terminals for supplying a charge current from a charger to the battery, at least first and second output terminals for supplying a current from the battery to a portable appliance, the charging terminals being spaced from the output terminals, and a charging terminal short-circuit prevention circuit, the short-circuit prevention circuit comprising:

a voltage detecting terminal for detecting an output voltage of the charger, the voltage detection terminal being spaced from the output terminals and the charging terminals, a switch for turning on and off the charge current between the battery and the charge terminal, and switch operating means for turning on the switch when application of a voltage to the voltage detecting terminal is detected.

5. The battery pack of claim 4, wherein the short-circuit prevention circuit comprises a resistor having a large resistance value connected parallel to the switch, wherein the charge current is supplied to the battery pack when a mounting of the battery pack on the charger is detected based on a voltage at at least one of the charging terminals of the battery pack.

6. The battery pack of claim 4, wherein the short-circuit prevention circuit comprises a through-output terminal spaced from the charging terminals, the output terminals and the voltage detecting terminal, for directly supplying current input from the voltage detecting terminal to the portable appliance when the battery is not used or when the battery is being charged.

* * * * *